United States Patent Office 2,867,577
Patented Jan. 6, 1959

2,867,577

PROCESS FOR REFORMING ARSENIC-CONTAINING HYDROCARBONS

Peter Urban, Jr., Chicago, and Ralph B. Thompson, Hinsdale, Ill., assignors to Universal Oil Products Company, Chicago, Ill., a corporation of Delaware No Drawing. Application June 14, 1952
Serial No. 293,646

17 Claims. (Cl. 208—88)

This invention relates to a catalytic conversion process and more particularly to a conversion process effected in the presence of a catalyst comprising alumina and a noble metal.

Recent developments in the field of reforming of gasoline in order to improve the antiknock characteristics of the gasoline and to the production of aromatic hydrocarbons are directed to the use of a catalyst comprising alumina and platinum. For the hydrocarbon conversion reactions it appears that alumina offers particular advantages in combination with a noble metal and particularly platinum. The association of alumina and platinum catalyzes the reactions desired in reforming operations to a greater extent than heretofore obtainable, with a minimum of undesired side reactions. The reactions desired in reforming operations include dehydrogenation of naphthenes to aromatics, dehydrocyclization of paraffins to aromatics, isomerization of alkyl-naphthenes containing 5 carbon rings to naphthenes containing 6 carbon rings and dehydrogenation to aromatics, isomerization of straight chain or slightly branched chain paraffins to more highly branched chain paraffins, controlled cracking or splitting of carbon to carbon bonds, desulfurization, etc. In the dehydrogenation operations to produce aromatics, the desired reactions include the dehydrogenation, dehydrocyclization and naphthene isomerization reactions set forth above.

As hereinbefore set forth, the combination of alumina and a noble metal and particularly platinum is especially active for effecting the desired reactions with a minimum of undesired side reactions. This catalyst appears peculiarly effective in the treatment of charge stocks comprising hydrocarbons and thus offers particular advantages for use in the conversion of hydrocarbons.

In the conversion of hydrocarbons, it now has been found that certain hydrocarbon charging stocks contain certain impurities which rapidly deactivate the alumina-platinum catalyst and render the same inactive for catalyzing the desired reactions as hereinbefore set forth. These impurities are present in hydrocarbon charge stocks in very minute quantities and, therefore, would not be expected to exert any substantial deactivating effect on the catalyst. Surprisingly, certain of these impurities, even in the very minute concentrations as are present in the hydrocarbon charge stocks, do rapidly deactivate the alumina-platinum catalyst and, therefore, render the process inoperable for the intended purpose. In accordance with the present invention, the charge stock is treated in order to remove the harmful impurities or to reduce the content thereof to a concentration at which the deleterious effects are substantially minimized.

In one embodiment the present invention relates to a conversion process effected in the presence of a catalyst comprising alumina and a noble metal, which comprises treating an impurity-containing charge with a nitrogen compound containing three attached groups and an unshared pair of electrons, separating therefrom a charge fraction having an impurity content of less than about 0.05 part per million and less than that of said charge, and subjecting said charge fraction to conversion in the presence of a catalyst comprising alumina and a noble metal.

In another embodiment the present invention relates to a hydrocarbon conversion process which comprises treating an arsenic-containing hydrocarbon charge with aqueous ammonia, separating therefrom a charge fraction having an arsenic content of less than about 0.05 part per million and less than that of said charge, and subjecting said hydrocarbon fraction to conversion in the presence of a catalyst comprising alumina and platinum.

In a specific embodiment the present invention relates to a process for producing reformed gasoline from an arsenic-containing hydrocarbon charge, which comprises treating the charge with an organic nitrogen compound containing three attached groups and an unshared pair of electrons, the total number of carbon atoms in said nitrogen compound being not more than 6, separating therefrom a gasoline fraction having an arsenic content of less than about 0.015 part per million and less than that of said charge, and reforming said gasoline fraction in the presence of a catalyst comprising alumina, platinum and combined halogen.

As will be noted from the embodiments, an arsenic-containing hydrocarbon charge is treated to lower the arsenic content to less than about 0.05 part per million. Preferably the arsenic content is reduced to below about 0.015 part per million. As hereinbefore set forth and as will be shown in the following examples, the presence of arsenic in concentrations of greater than even the minute quantities of 0.05 part per million rapidly deactivates the alumina-platinum catalyst. While it is believed that arsenic is the most harmful impurity, other undesirable impurities having a deleterious effect on the catalyst include molybdenum, antimony, nickel, cadmium and lead. It is understood that these impurities may be present as the element or probably as one or more compounds thereof, and that reference to the element in the present specifications and claims is intended to include the free element and/or compounds thereof. This method of referring to the element is justified because it appears that the element is the harmful component and that, when present as a specific compound, the compound may decompose and other compounds of the element formed during the conversion reaction. For example, it is believed that arsenic deactivates the catalyst by forming a platinum arsenide or other compound of platinum and arsenic. Although arsenic is considered as a non-metal by some authorities, it resembles the metals in a number of respects and, in view of the fact that the other impurities hereinbefore set forth are metals, it is understood that reference to metallic impurities or similar phraseology is intended to include arsenic along with the other impurities as set forth above, and that removal of these metallic impurities below 0.05 part per million means that the treated charge does not contain any one of these impurities in a concentration above 0.05 part per million, although the sum total of the impurities may be above 0.05 part per million.

As hereinbefore set forth, the novel features of the present invention are directed to catalysts comprising alumina and a noble metal. Platinum is a preferred noble metal for use in accordance with the present invention. Other noble metals include palladium, silver, gold, ruthenium, rhodium, osmium, iridium, etc., with the understanding that these catalysts are not necesarily equivalent. The platinum preferably is utilized in the catalyst in a concentration of from about 0.01% to about 1% by weight of the final catalyst, although it is understood that lower or higher concentrations of platinum, which generally will not be above about 10%, may be employed.

As hereinbefore set forth, the catalyst contains alumina. In one embodiment the alumina comprises a major proportion of the catalyst and may comprise, for example, over 95% by weight of the catalyst. In another embodiment, the catalyst may include alumina as well as other inorganic oxides as, for example, oxides of silicon, magnesium, zirconium, thorium, vanadium, titanium, boron, etc., or mixtures thereof, and the alumina, moreover, may comprise a minor proportion of the catalyst. For example, one catalyst may comprise silica-alumina-platinum and in one embodiment the silica may comprise from about 70% to about 95% and the alumina may comprise from about 5% to about 30% by weight of the mixture.

It is understood that the alumina and other inorganic oxides are porous and reference to alumina in the present specifications and claims is intended to refer to porous alumina, including gamma-alumina, and not to include non-porous aluminas as a component of the catalyst in a substantial amount.

In a preferred embodiment the alumina-platinum catalyst also contains a halogen. The halogen may be in a concentration of from about 0.01% to about 8% by weight of the final catalyst, although higher or lower concentrations may be employed. The halogen is believed to be present in combined form, and the halogen preferably comprises combined fluorine which advantageously is present in a concentration of from about 0.01% to about 3% by weight of the catalyst. The combined chlorine generally is present in a concentration of from about 0.1% to about 8% by weight of the catalyst. The combined bromine and combined iodine generally are not as preferable but may be employed, when desired, in a concentration of from about 0.01% to about 8% by weight of the catalyst. It is understood that the various halogens which may be employed are not necessarily equivalent and also that the combined halogen content of the catalyst may comprise a mixture of two or more of the halogens, in which case the total halogen concentration preferably comprises from about 0.01% to about 8% by weight of the catalyst.

As hereinbefore set forth, charge stocks containing arsenic are treated with a particular nitrogen compound to separate a charge fraction having an arsenic content of below about 0.05 part per million and preferably below about 0.015 part per million. The nitrogen compound for use in accordance with the present invention contains three attached groups and an unshared pair of electrons. The nitrogen compound will contain the following configuration:

where $R_1$, $R_2$ and $R_3$ are selected from hydrogen, aliphatic radicals and polar groups containing nitrogen, oxygen, etc.

The nitrogen compound may be inorganic or organic. Inorganic compounds include aqueous ammonia, hydrazine, etc. The organic compounds, for the reasons to be hereinafter set forth, preferably contain not more than 6 carbon atoms to the molecule. Alkanol amines for use in accordance with the present invention include ethanol amine, propanol amine, butanol amine, pentanol amine, hexanol amine, diethanol amine, triethanol amine, etc. Aliphatic amines may be primary, secondary or tertiary and include methyl amine, dimethyl amine, trimethyl amine, ethyl amine, diethyl amine, triethyl amine, propyl amine, dipropyl amine, butyl amine, amyl amine, hexyl amine, etc. Alkylene polyamines include ethylene diamine, propylene diamine, butylene diamine, amylene diamine, hexylene diamine, diethylene triamine, dipropylene triamine, etc. As hereinbefore set forth, the reason that the organic nitrogen compound should contain not more than 6 carbon atoms to the molecule is because most of these organic nitrogen compounds containing more than 6 carbon atoms per molecule lose their water solubility and become hydrocarbon soluble. However, this is not true with the alkylene polyamines containing increasing numbers of nitrogen atoms. Therefore, in the case of these polyamines, compounds containing more than 6 carbon atoms may be utilized as, for example, compounds as tetraethylene penta-amine, pentaethylene hexa-amine, etc.

Additional examples of organic nitrogen compounds containing oxygen include formamides such as formamide, dimethyl formamide, diethyl formamide, etc., acetamide, propionamide, butyramide, valeramide, etc. The latter compounds are solid at low temperatures and, when used at such temperatures, should be employed as solutions in water or, when desired, in other solvents such as alcohol, ketones, etc., the latter preferably being in admixture with water.

It is understood that the specific compounds hereinbefore set forth are representative of the compounds which may be used in accordance with the present invention and that the various compounds will not be necessarily equivalent. It is also understood that a mixture of two or more of the nitrogen-containing compounds may be utilized when desired.

While the anhydrous nitrogen compounds may be employed, it generally is preferable to utilize the same as a solution in a solvent which is not substantially soluble in the hydrocarbon charge being treated in accordance with the present invention. For this reason, water is a preferred solvent. Other suitable solvents include low molecular weight alcohols, ketones, etc., preferably containing not more than about 5 carbon atoms per molecule. The solvent may be utilized in an amount of from about 5 to about 95% by volume of the mixture and preferably of from about 25% to about 90% thereof. In order that the treating agent will be readily separated from the hydrocarbons, it is preferred, as hereinbefore set forth, that the organic nitrogen compound contains not more than 6 carbon atoms per molecule. Organic nitrogen compounds containing more than 6 carbon atoms per molecule tend to become soluble in the hydrocarbon charge fraction and, therefore, will necessitate other means of separating the organic amine compound from the hydrocarbons, whereas the use of a nitrogen compound which is insoluble in hydrocarbons permits ready separation by conventional methods.

While not limited to the explanation, it is believed that the arsenic compounds are removed from the hydrocarbon charge stocks through the formation of a complex of the arsenic with the nitrogen compounds. Therefore, the temperature of treatment should be below that at which the complex, as formed, will dissociate. In general atmospheric temperature is preferred, although lower of higher temperature may be employed, the higher temperature in general not being above about 200° F. The pressure may range from atmospheric to 1000 pounds or more and preferably is sufficient to maintain the hydrocarbons and nitrogen compounds in substantially liquid phase.

Treatment in accordance with the present invention may be effected in any suitable manner which may be batch or continuous types of operation. In a batch type of operation, the hydrocarbon charge stock and nitrogen compound are intimately mixed in a suitable zone, following which the mixing is discontinued and the mixture is allowed to settle into a hydrocarbon phase and a phase containing the nitrogen compound-arsenic complex. Each phase is then separately withdrawn.

In a continuous type of operation the hydrocarbon charge and the nitrogen compound are passed either concurrently or countercurrently into a suitable zone which may contain suitable mixing devices, packing material such as Raschig rings, clay, bauxite, etc., and/or fractionating means such as bubble decks, side to side pans, etc. An upper treated hydrocarbon layer is separately withdrawn from the lower layer containing the nitrogen compound-arsenic complex. The withdrawal may be continuous or intermittent.

The nitrogen-containing compound preferably is utilized in an amount at least equal on a mol basis to the arsenic content of the hydrocarbon charge. As a general rule, an excess of nitrogen compound will be employed to insure substantially complete reaction and to effect maximum removal of arsenic from the hydrocarbon charge.

In another embodiment, it may be advisable in some cases to subject the treated distillate to fractionation or other methods in order to segregate a treated fraction further reduced in arsenic. With certain hydrocarbon distillates, the original treatment may convert the arsenic into a different form and the new arsenic compounds, when more volatile, may be removed as an overhead fraction by distillation or, when high boiling, may be retained in the bottoms of the distillation. In other cases, the treatment may be followed by water washing in order to further remove the small amount of arsenic compounds which may have transformed by the prior treatment and/or not removed thereby.

As hereinbefore set forth, the novel features of the present invention are particularly applicable to the treatment of a gasoline fraction to be subjected to reforming. It is understood that the gasoline fraction may comprise a full boiling range gasoline having an end boiling point of from about 400° to about 430° F., or any selected fraction thereof and that it may include components boiling above the gasoline range, thus having an end boiling point up to 500° F. or more. The hydrocarbon fraction preferably comprises a substantially saturated hydrocarbon distillate, including straight run gasoline, natural gasoline, etc., or mixtures thereof. In some cases it may comprise an unsaturated distillate, including cracked gasoline, as well as mixtures of the unsaturated gasoline and saturated gasoline. The reforming operation is effected at a temperature of from about 600° to about 1000° F. or more, a pressure of from about atmospheric to 1000 pounds per square inch or more, and a weight hourly space velocity from about 0.1 to 10 or more. The weight hourly space velocity is defined as the weight of oil per hour per weight of catalyst in the reaction zone. In one embodiment, the reforming is effected in the presence of hydrogen and, in this embodiment, the hydrogen produced in the process preferably is recycled for further use therein. The concentration of hydrogen to hydrocarbon in the reaction zone generally will be in a molar ratio of from about 0.1:1 to about 10:1 or more. When the hydrogen gas to be recycled contains hydrogen sulfide or other impurities, it is within the scope of the invention to treat the recycle gas to remove the impurities before reusing the gas in the process.

In another preferred embodiment, the novel features of the present invention are particularly applicable to the conversion of naphthenes into aromatics as hereinbefore set forth. Generally the charge in this embodiment will comprise a selected hydrocarbon distillate which, in one embodiment, may have a boiling range of from about 140° to about 280° F. The conditions of operation used in this embodiment are substantially the same as those hereinbefore set forth except that the temperature to be employed preferably is within the range of from about 800° to 1000° F. or more.

While the process of the present invention is particularly applicable to the reforming or aromatization reactions hereinbefore set forth, it is understood that the novel features may be employed in any process in which a catalyst comprising alumina and a noble metal and particularly platinum is used. Representative processes include dehydrogenation of normally gaseous aliphatic hydrocarbons, such as ethane, propane and/or butane to the corresponding olefins, dehydrogenation of mono-olefins to di-olefins, destructive hydrogenation or hydrocracking reactions in which a hydrocarbon and particularly oil heavier than gasoline is subjected to conversion to produce lower boiling products and particularly gasoline, non-destructive hydrogenation reactions, including hydrogenation of unsaturated aliphatic compounds, such as mono-olefins, di-olefins, etc. to form the corresponding saturated hydrocarbons, hydrogenation of unsaturated cyclic hydrocarbons, hydrogenation of unsaturated alcohols, ketones, acids, etc., oxidation of olefins to form the corresponding oxides, such as the oxidation of ethylene to ethylene oxide, propylene to propylene oxide, etc., oxidation of alcohols, ketones, etc. The conditions of operation to be employed will depend upon the particular reaction to be effected. Thus, for non-destructive hydrogenation reactions, the temperature may range from atmospheric to 500° F. or more, the pressure from about 10 to about 2000 pounds or more, and the weight hourly space velocity of from about 0.1 to 10 or more.

The conversion reactions mentioned above may be effected in any suitable manner. The reforming process thus may be effected in the fixed bed, slurry type, moving bed or fluidized type process.

The following examples are introduced to illustrate further the novelty and utility of the present invention but not with the intention of unduly limiting the same.

EXAMPLE I

To a catalyst comprising alumina, about 0.3% by weight of platinum and about 0.2% by weight of combined fluorine, arsenic was added in a concentration of 0.0025 gram atoms per 50 grams of catalyst. The arsenic was added as arsenic pentoxide in ammoniacal solution by dissolving the required amount in 50 ml. of water and pouring over 50 grams of the catalyst. The catalyst was allowed to stand for one-half hour, then was dried on a water bath and finally calcined for 3 hours in a muffle furnace at 932° C.

The catalysts in this example were utilized for the aromatization of a Mid-Continent naphtha having an A. P. I. gravity at 60° F. of 52.7, an aromatic content of 8.8% and a boiling range of 229° to 387° F. The aromatization was effected at a temperature of 977° F., a superatmospheric pressure of 300 pounds per square inch and a hydrogen to hydrocarbon molar ratio of 1.75:1.

Catalyst A comprised alumina-platinum-halogen composite as described above but not containing the arsenic. Catalyst B comprised the catalyst containing the arsenic as described above.

In the aromatization runs, Catalyst A produced an average of 48.3% by weight of aromatics. In contrast, Catalyst B under the same conditions produced only 23.6% by weight of aromatics. It thus will be noted that the arsenic reduced the aromatization activity of the catalyst to less than half of the catalyst not containing arsenic.

EXAMPLE II

Other catalysts were prepared in a similar manner as described in Example I but contained 0.0025 gram atoms of molybdenum, antimony, nickel, cadmium, and lead. These catalysts when untilized under the same conditions as described in Example I produced the following yields of aromatics.

Table

| Added component: | Percent aromatics |
|---|---|
| None | 48.3 |
| Molybdenum | 24.5 |
| Antimony | 30.0 |
| Nickel | 30.2 |
| Cadmium | 30.7 |
| Lead | 33.5 |

Here again it will be noted that catalysts containing as low as 0.0025 gram atoms of the various impurities considerably reduced the aromatization activity of the catalysts.

EXAMPLE III

In a commercial reforming process utilizing a catalyst as described in Example I and charging approximately 1200 barrels per day of Mid-Continent naphtha, the activity of the catalyst decreased rapidly. The naphtha had an A. P. I. gravity of about 53.0, a boiling range of from 210° to 428° F. and contained approximately 6.8% by weight of aromatics. It was found that the naphtha being charged to this unit contained approximately 0.16 part per million of arsenic.

As hereinbefore set forth, one of the desired reactions in reforming operations is dehydrogenation of the naphthenes to aromatics. This dehydrogenation is highly endothermic and, therefore, results in a comparatively large temperature differential between the inlet and outlet of a reaction zone maintained under adiabatic conditions. This temperature differential is indicative of the dehydrogenation activity of the catalyst. In this process, the naphtha was introduced into the reaction zone at a temperature of approximately 900° F. and in normal operations a temperature drop of above about 50 degrees indicates that satisfactory dehydrogenation is obtained. However, because of the arsenic content of the naphtha, the temperature differential between the inlet and outlet of the reaction zone on the first day was 53° F. but after 11 days of operation it dropped to 17° F. It readily is apparent that this small temperature differential indicates substantial loss in the dehydrogenation activity of the catalyst.

As measured in octane number, the operation in which the temperature differential between the inlet and outlet of the reaction zone was above about 50° F. resulted in a reformate having an F-1+3 cc. of tetraethyl lead octane number of 92. In contrast, under the same conditions of operation but utilizing the catalyst deactivated by arsenic-containing impurities, in which the temperature differential between the inlet and outlet of the reaction zone was only 17° F., the F-1+3 cc. of tetraethyl lead octane number was only 72.4. The F-1+3 cc. of lead octane number of the charge fraction was 66.5. Thus it is seen that the temperature differential in the reaction zone is a measure of the activity of the catalyst.

EXAMPLE IV

A South American naphtha having an A. P. I. gravity of about 57° and a boiling range of from about 180° to 335° F. contained 0.059 part per million of arsenic. A sample of this naphtha was treated at room temperature with concentrated ammonium hydroxide. This treatment reduced the arsenic content of the naphtha to substantially zero.

EXAMPLE V

The naphtha treated in this example comprised a Mid-Continent naphtha having an A. P. I. gravity of about 55°, a bromine number of about 1 and a boiling range of from about 190° to about 450° F. This naphtha had an arsenic content of 0.12 part per million.

A 500 gram sample of this naphta was mixed with 100 cc. of anhydrous diethylene triamine, and intimately stirred, after which the mixture was allowed to settle into two phases and each phase was separately withdrawn. This treatment reduced the arsenic content of the naphtha to about 0.015 part per million.

EXAMPLE VI

A 500 gram sample of the naphtha described in Example V was intimately mixed in 100 cc. of a 90% solution of dimethyl formamide in water, after which the mixture was allowed to settle into two phases and each phase was separately withdrawn. This treatment reduced the arsenic content of the naphtha to about 0.02 part per million.

EXAMPLE VII

A straight run naphtha having an A. P. I. gravity of about 65°, a boiling range of from about 110° to about 370° F. and an arsenic content of about 0.80 part per million may be treated with a 5% solution of ammonium hydroxide in water at room temperature. This treatment will serve to reduce the arsenic content of the naphtha to below about 0.015 part per million.

EXAMPLE VIII

Another sample of the naphtha in Example VII may be treated with a solution of 50% diethylene triamine in water at 110° F. This treatment will serve to reduce the arsenic content of the naphtha to below about 0.015 part per million.

EXAMPLE IX

An arsenic-containing naphtha may be treated with a 50% ethyl amine solution in methyl alcohol at room temperature. The untreated naphtha has an arsenic content of above about 0.05 part per million and treatment in accordance with the present invention will reduce the arsenic content to below about 0.015 part per million.

EXAMPLE X

An arsenic-containing naphtha may be treated with a 75% hydrazine solution in water at room temperature. The untreated naphtha has an arsenic content of above about 0.05 part and treatment in accordance with the present invention will reduce the arsenic content to below about 0.015 part per million.

We claim as our invention:

1. The method of converting an arsenic-containing hydrocarbon charge which comprises treating the charge with a sulfur-free reagent consisting essentially of a nitrogen compound containing three attached groups and an unshared pair of electrons, separating therefrom a charge fraction having an arsenic content of less than about 0.05 part per million and less than that of said charge, and subjecting said charge fraction to conversion in the presence of a catalyst comprising a noble metal.

2. The method of converting an arsenic-containing hydrocarbon charge which comprises treating the charge with a sulfur-free reagent consisting essentially of ammoniated water, separating therefrom a charge fraction having an arsenic content of less than about 0.015 part per million and less than that of said charge, and subjecting said charge fraction to conversion in the presence of a catalyst comprising alumina, platinum and combined halogen.

3. The process of producing reformed gasoline from an arsenic-containing hydrocarbon charge which comprises treating the charge with a sulfur-free reagent consisting essentially of a nitrogen compound containing three attached groups and an unshared pair of electrons, separating therefrom a gasoline fraction having an arsenic content of less than about 0.015 part per million and less than that of said charge, and reforming said gasoline in the presence of a catalyst comprising platinum.

4. The process of claim 3 further characterized in that said nitrogen compound is inorganic.

5. The process of claim 3 further characterized in that said reagent is ammoniated water.

6. The process of claim 3 further characterized in that said nitrogen compound is an organic nitrogen compound having not more than 6 carbon atoms per molecule.

7. The process of claim 6 further characterized in that said organic nitrogen compound is an alkylene polyamine.

8. The process of claim 7 further characterized in that said alkylene polyamine is diethylene triamine.

9. The process of claim 6 further characterized in that said organic nitrogen compound is an alkanol amine.

10. The process of claim 9 further characterized in that said alkanol amine is ethanol amine.

11. The process of claim 6 further characterized in that said organic nitrogen compound is an alkyl amine.

12. The process of claim 11 further characterized in that said alkyl amine is ethyl amine.

13. The process of claim 6 further characterized in that said organic nitrogen compound is formamide.

14. The process of claim 13 further characterized in that said formamide is dimethyl formamide.

15. The process of producing reformed gasoline from an arsenic-containing hydrocarbon charge which comprises treating the charge with a sulfur-free reagent consisting essentially of a nitrogen compound containing three attached groups and an unshared pair of electrons, separating therefrom a gasoline fraction having an arsenic content of less than about 0.015 part per million and less than that of said charge, and reforming said gasoline fraction in the presence of a catalyst comprising alumina, platinum and combined halogen.

16. The process of producing aromatics from an arsenic-containing hydrocarbon charge which comprises treating said charge with a sulfur-free reagent consisting essentially of a nitrogen compound containing three attached groups and an unshared pair of electrons, separating therefrom a hydrocarbon fraction having an arsenic content of less than about 0.05 part per million and less than that of said charge and subjecting said hydrocarbon fraction to aromatization in the presence of a catalyst comprising alumina and a noble metal.

17. The process of producing aromatics from a naphthenic hydrocarbon charge containing arsenic which comprises treating the charge with a sulfur-free reagent consisting essentially of ammoniated water, separating therefrom a naphthene fraction having an arensic content of less than about 0.015 part per million and less than that of said charge, and subjecting said fraction to dehydrogenation in the presence of a catalyst comprising alumina and platinum.

References Cited in the file of this patent

UNITED STATES PATENTS

| | | |
|---|---|---|
| 1,423,710 | Clancy | July 25, 1922 |
| 2,470,887 | Chenicek | May 24, 1949 |
| 2,479,110 | Haensel | Aug. 16, 1949 |
| 2,683,683 | Mills | July 13, 1954 |
| 2,703,306 | Asselin | Mar. 1, 1955 |

OTHER REFERENCES

Mellor: "Comprehensive Treatise on Inorganic and Theoretical Chemistry," vol. 8, pages 271–272 (1928), Longmans, Green and Co., 55 Fifth Ave., New York.

Lewis et al.: Ind. and Eng. Chem., Anal. Ed., vol. 9, pages 405–406 (1937).

Thomas: "The Science of Petroleum," vol. 11, Oxford University Press, page 1054 (1938).

Berkman: "Catalysis," Reinhold Pub. Co., 1940, pages 393, 395, 402.

"Chemical Refining of Petroleum," Kalichevsky et al., 2nd edition, page 34 (1942), Reinhold Publishing Co., New York.

Maxted: "Journal of the Society of Chemical Industry," vol. 67, pages 93–97, March 1948.

"Chem. Abstracts," vol. 45, 3698g, May 10, 1951.